Patented May 15, 1951

2,553,049

UNITED STATES PATENT OFFICE 2,553,049

CONDENSATION PRODUCTS OF THE NAPHTHOQUINONE-IMINE SERIES

Valentin Kartaschoff and Ernest Merian, Basel, Switzerland, assignors to Sandoz, A. G., Basel, Switzerland, a Swiss firm No Drawing. Application February 13, 1950, Serial No. 144,041. In Switzerland February 24, 1949

14 Claims. (Cl. 260—163)

This invention relates to the preparation of new and valuable compounds of the naphthoquinone-imine series.

It is known that if dinitronaphthalene is reduced in sulfuric acid a compound generally referred to as "naphthazarine intermediate" having the formula

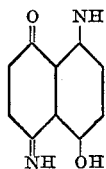

or—according to the modern writing—

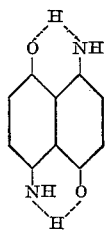

is produced, and that this compound can be condensed with amines and further sulfonated to yield dyestuffs.

It has been found that while the condensation products obtained by condensing the naphthazarine intermediate with amines, are more fully described in U. S. Patent No. 647,370, and having the general formula

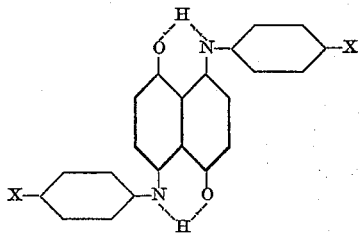

—X being —H, —CH₃ or —NH₂, are suitable for coloring oils, fats and waxes, including petroleum oil fractions such as gasoline in beautiful green shades, and if sulfonated are useful as acid wool dyestuffs, they have practically no affinity for cellulose acetate and superpolyamides.

It has further been ascertained that while the condensation products obtained by condensing the naphthazarine intermediate with only one amine, as more fully described in U. S. Patents Nos. 2,066,119 and 2,135,366 and having the general formula

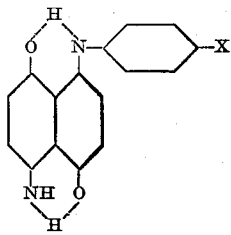

—X being —H, —OH, —NH₂, —O-alkyl or —O-alkyl —OH are suitable for dyeing cellulose acetate and superpolyamides, the results are only blue to greenish-blue shades.

It is an object of this invention to produce a new class of condensation products, by condensing one mole of naphthazarine intermediate with one mole of an aromatic aminoazo compound, which are suitable for dyeing cellulose acetate and superpolyamides in beautiful green, yellowish-green, olive and brown shades.

It could not be expected that aminoazo compounds can easily be condensed with naphthazarine intermediate as this derivative can only be condensed with a small selection of aromatic amines. It is furthermore very surprising that these new condensation products have such a great affinity for cellulose acetate and superpolyamides, since for instance the condensation products of the formulae

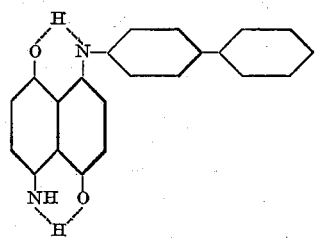

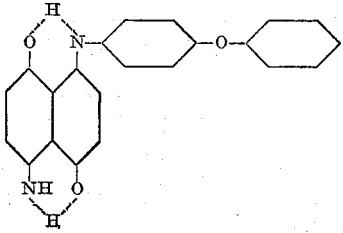

and

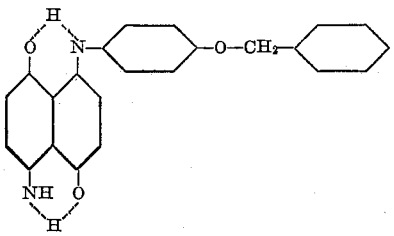

have practically no affinity for cellulose acetate and superpolyamides.

It is a further object of this invention to dye cellulose ester fibers, synthetic polyamide fibers and polyurethane fibers in green, yellowish-green, olive and brown shades with uniform dyestuffs of the dispersed type. Up to now these shades were produced either by using dyestuff mixtures of the dispersed type, i. e. mixtures of yellow and blue dyestuffs, or by dyeing cellulose acetate and superpolyamides with aromatic aminoazo compounds followed by diazotizing and developing with suitable coupling compounds, this process being very complicated. Dyestuff mixtures of the dispersed types moreover, have the disadvantage that, depending upon the method of dyeing, different shades are obtained, being sometimes more yellow, and sometimes more blue. Furthermore, these mixtures are either fast to light or fast to gas-fumes, according to the blue component employed.

It is therefore a further object of this invention to dye cellulose ester fibers, synthetic polyamide fibers and polyurethane fibers in green, yellowish green, olive and brown shades of good fastness to light and to gas-fumes with uniform dyestuffs of the dispersed type which can be discharged in light shades giving a pure white.

As aminoazo compounds suitable for condensation with the naphthazarine intermediate, the most varied substituted derivatives of the general formula

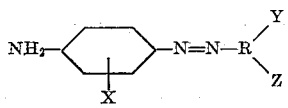

wherein X, Y and Z stand for hydrogen or a substituent other than the sulfonic acid group and wherein R is a carbocyclic or a heterocyclic radical, can be used, as for example 4-aminoazobenzene, 4-aminoazotoluene, 4'-amino-4-nitroazobenzene, 4'-amino-4-carboxyazobenzene, 4'-amino-4-dimethylaminoazobenzene, 4'-amino-4-ethyl-hydroxyethylaminoazobenzene, 4'-amino-4-hydroxyethylaminoazobenzene, 4'-amino-4-ethylglycerylaminoazobenzene, 4-aminobenzeneazonaphthalene, 4-amino-2-hydroxyazobenzene, 4'-ethoxy-4-amino-2-hydroxyazobenzene, aniline-(4'-azo-4)-(3-methylpyrazolone-(5)), 4-amino-2'-hydroxy-5'-methylazobenzene and so on.

In so far as these compounds have not been previously described, they can be obtained by coupling diazotized nitroanilines with the desired coupling components and subsequent reduction of the nitro group with e. g. sodium sulphide or sodium sulfhydrate or by coupling diazotized aminoacetanilides or any other aminoacylanilides followed by a hydrolysis of the acyl-amido-group.

The condensation with the naphthoquinone-imine is advantageously carried out in the presence of a solvent which is indifferent to the reaction compounds, such as e. g. acetic acid, propionic acid, ethanol, isopropanol, and dilute acetic acid, at an elevated temperature and may also advantageously be carried out in presence of a condensation accelerator such as boric acid, copper, copper salts, sodium acetate and the like.

The new condensation products thus obtained correspond to the general formula

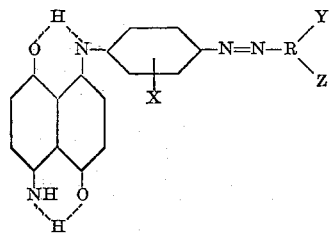

in which X, Y and Z are hydrogen or a substituent other than the sulfonic acid group and R is a carbocyclic or a heterocyclic radical.

These new compounds dissolve in organic solvents with green, yellowish-green, olive or brown colors. They can be used either as dyestuffs for cellulose ester fibers, synthetic polyamide and polyurethane fibers or as intermediates for the preparation of other dyestuffs.

The following examples illustrate how the invention may be carried out in practice, but the examples are in no way limitative. Parts are by weight and temperatures in degrees centigrade.

*Example 1*

40 parts of 5-amino-8-hydroxy-1.4-naphthoquinone-imine-(1), i. e. of naphthazarine intermediate, are dissolved in 400 parts of boiling glacial acetic acid. The mass is then cooled to 100°, and at this temperature 40 parts of 4-aminoazobenzene are added. The condensation is finished after about 2 hours and the solution is then dark green. The melt is then poured into 1500 parts of ice water, filtered and washed free from a small excess of aminoazobenzene with warm water. The residue dissolves in ethanol with a green color and in concentrated sulfuric acid with a greenish-yellow color which becomes green on the addition of paraformaldehyde. It corresponds to the formula

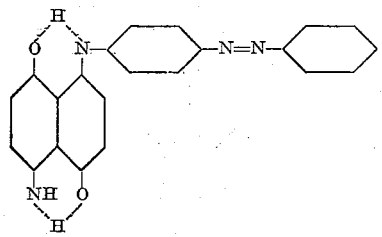

and dyes acetate silk and nylon in suspension a pure green shade. Similar products are obtained by using ethanol, isopropanol, dilute acetic acid or propionic acid in lieu of the glacial acetic acid.

*Example 2*

If the aminoazobenzene in Example 1 is replaced by 45 parts of 4-aminoazotoluene, there is obtained a similar product which is more yellowish when dyed on acetate silk and nylon and which corresponds to the formula

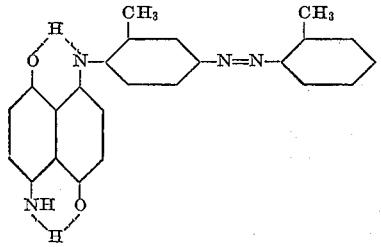

Example 3

30 parts of 5-amino-8-hydroxy-1.4-naphtho-quinone-imine-(1) are stirred with 300 parts of glacial acetic acid for half an hour at 110°. Thereupon it is cooled to 80° and 44 parts of 4'-amino - 4 - ethylhydroxyethyl-aminoazobenzene added, and stirred for a further hour. After pouring into water a black-green powder is obtained which dissolves in alcohol with a yellowish orange color and in concentrated sulfuric acid with a yellow color which after addition of paraformaldehyde becomes yellowish-green. It corresponds to the formula

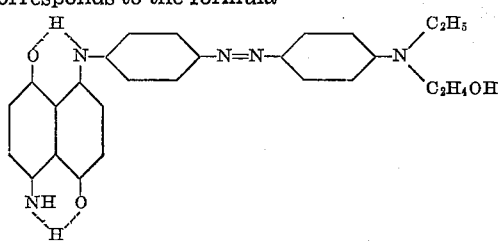

and dyes acetate silk yellowish-brown and nylon brownish olive. It corresponds to the formula

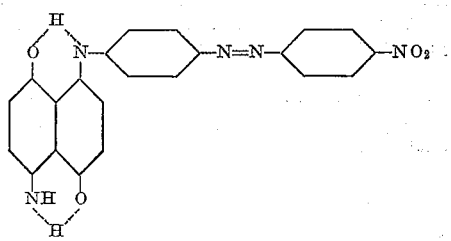

Example 4

30 parts of 5-amino-8-hydroxy-1.4-naphtho-quinone-imine-(1) are heated in 30 parts of glacial acetic acid to boil for half an hour and then brought to 90°, when 40 parts of 4'-amino-4-nitro-azobenzene are added. After a short time a test specimen dissolves in ethanol with a brown color. The reaction mass is poured into water, filtered, washed and dried. The dark-brown powder dyes acetate silk yellowish and nylon reddish brown.

Example 5

46.5 parts of raw material containing 81% of naphthazarine intermediate, as it is obtained from 1.5-dinitronaphthalene, are stirred up in 450 parts of acetic acid at 80° in presence of 45.5 parts of 4-amino-2'-hydroxy-5'-methyl-azobenzene. After 3 hours the reaction mass is heated for 1 hour up to 90°, when it is poured into ice-water. The precipitated new condensation product is filtered off, washed with hot water until the filtrate is colorless and dried. It corresponds to the formula

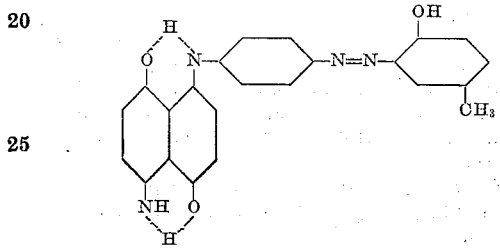

and dyes acetate silk and nylon very strong yellowish olive shades.

A series of similar condensation products is made by proceeding in accordance with the foregoing examples, the properties of which are listed in the following table:

| Amino compound used for the condensation | Color of the solution in ethanol | Color of the sol. in conc. sulfuric acid | Color of the sol. in conc. sulfuric acid on addition of p-formaldehyde | Color of dyeing on acetate silk | Color of dyeing on nylon |
| --- | --- | --- | --- | --- | --- |
| 4-aminoazobenzene | green | yellow-green | green | pure green | pure green. |
| 4-aminoazotolene | yellowish green | yellow | brown | yellowish green | yellowish green. |
| 4'-amino-4-nitro-azobenzene | brown | do | orange | yellowish brown | reddish brown. |
| 4'-amino-4-dimethylamino-azobenzene | greenish blue | greenish blue | blue-green | green-blue | green-blue. |
| 4'-amino-4-ethyl-glycerylamino-azobenzene | grass-green | yellow-green | yellow-olive | bluish-green | bluish-green. |
| 4'-amino-4-hydroxyethylamino-azobenxene | blue-green | greenish-yellow | olive-green | greenish-blue | greenish-blue |
| 4'-amino-4'-ethyl-hydroxyethylamino-azobenzene | yellow-orange | yellow | yellow-green | yellowish-brown | brownish-olive. |
| 4'-amino-4-carboxy-azobenzene | yellowish green | greenish brown | green | green | green. |
| 4'-amino-2-hydroxy-5-methyl-azo-benzene | grass-green | brown | reddish brown | yellowish olive | yellowish olive. |
| 4-amino-2-hydroxy-azobenzene | yellowish green | yellowish brown | red-brown | yellow-green | yellow-green. |
| 4'-ethoxy-4-amino-2-hydroxy-azobenzene | do | carmine | olive-brown | do | yellowish olive. |
| 4-aminobenzene-azonapthalene-(1) | bluish green | blue-green | blue-violet | blue | bluish green. |
| Aniline-(4'-azo-4)-(3-methyl-pyrazolone-(5)) | blue-green | yellow-green | green | greenish blue | blue-green. |
| 4-benzeneazo-naphthylamine-(1) | green olive | reddish brown | brown | olive | olive-brown. |
| 4'-amino-4-dihydroxyethyl-aminoazobenzene | yellow-orange | yellow | yellow-green | yellowish brown | brownish olive. |

While the dye compounds of the invention have been described more particularly in connection with the coloration of cellulose acetate and nylon textile materials, it is to be noted that they are useful for the coloration of the other materials named herein and that they yield about the same colors on these materials as they do on cellulose acetate and nylon.

These dyes may be advantageously directly applied to the material undergoing coloration in the form of an aqueous suspension which can be prepared by milling the dye together with a suitable dispersing agent, such as e. g. the condensation product of beta-naphthalene-sulfonic acid and formaldehyde, a sulfonated aliphatic alcohol or soap, in presence of common salt, sodium sulfate i. e. to get more efficient milling, and by grinding said mixture to a paste in the presence of a sulfonated oil, soap or other suitable dispersing agent and dispersing the resulting paste in water. In some instances, the dye may possess sufficient solubility in water as to render the use of a dispersing agent unnecessary. Generally speaking, however, the use of a dispersing agent is desirable.

Direct dyeing operations can, with advantage, be conducted at temperatures of about 60–85°, but any suitable temperature may be used. Thus, the textile material to be dyed or colored is ordinarily added to the dye-bath at a temperature lower than that at which the main portion of the dyeing is to be effected, a temperature approximating 45–55°, for example, following which the temperature is raised to that selected for carrying out the dyeing operation. The temperature at which the dyeing is conducted may of course be varied somewhat depending upon the particular material undergoing coloration. As is understood by those skilled in the art, the intensity of dyeing can be varied by varying the proportion of dye to material undergoing coloration. Generally speaking 0.1–4% by weight of dye to material is employed although any desired proportions can be used.

The following example is given to illustrate a method for applying such colors to cellulose acetate fibers:

*Example 6*

40 parts of the insoluble dye of Example 1 are milled together with 40 parts of the sodium salt of a fatty alcohol sulfonate and 20 parts of sodium sulfate. The powder thus obtained is mixed first with the same weight of a highly sulfonated Turkey red oil into a fine paste, upon which water at 60° is poured. The whole is stirred until uniform dispersion is obtained, when it is added to the dye-bath through a sieve. The volume of dye liquor is 1:20 on the weight of the material, the dye-bath being made up with the requisite amount of color and 2 grams of fatty alcohol sulfonate per liter. The material is entered at 40–50°, the temperature is slowly raised to 80° and dyeing is continued at this temperature for 1 hour. After dyeing, the goods are well washed off. One obtains pure green shades fast to light, to gas-fumes and to washing.

The process, as precedingly disclosed for the dyeing of cellulose acetate, can be used in applying the dyes of the present invention to other cellulose ester fibers, to synthetic polyamide fibers and to polyurethane fibers.

Having thus disclosed the invention, what is claimed is:

1. A process for the manufacture of a condensation product of the naphthoquinone-imine series, comprising the step of condensing 5-amino-8-hydroxy-1.4-naphthoquinone-imine-(1) in a solvent with an equimolecular quantity of an aromatic aminoazo compound free from sulfonic acid groups, at a temperature of at least 60° C.

2. A process for the manufacture of a condensation product of the naphthoquinone-imine series, comprising the step of condensing 5-amino-8-hydroxy-1.4-naphthoquinone-imine-(1) in a solvent with an equimolecular quantity of an aromatic aminoazo compound which corresponds to the formula

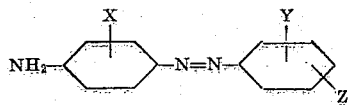

in which X, Y, Z stand for a member selected from the group consisting of hydrogen, lower alkyl, hydroxy, nitro, alkylamino, dialkylamino, alkoxy, hydroxyalkylamino, dihydroxydialkylamino, alkylhydroxyalkylamino and carboxy at a temperature of at least 60° C.

3. A process for the manufacture of a condensation product of the naphthoquinone-imine series, comprising the step of condensing 5-amino-8-hydroxy-1.4-naphthoquinone-imine-(1) in a solvent with 4-aminoazobenzene at a temperature of at least 60° C.

4. A process for the manufacture of a condensation product of the naphthoquinone-imine series, comprising the step of condensing 5-amino-8-hydroxy-1.4-naphthoquinone-imine-(1) in a solvent with 4'-amino-4-nitro-azobenzene at a temperature of at least 60° C.

5. A process for the manufacture of a condensation product of the naphthoquinone-imine series, comprising the step of condensing 5-amino-8-hydroxy-1.4-naphthoquinone-imine-(1) in a solvent with 4'-amino-4-ethyl-hydroxyethyl-amino-azobenzene at a temperature of at least 60° C.

6. The condensation products of the naphthoquinone-imine series, corresponding to the general formula

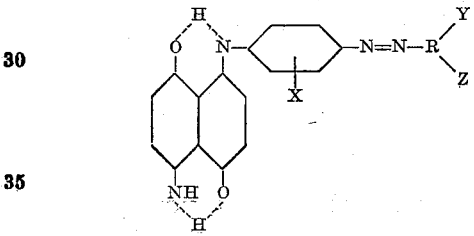

wherein X, Y and Z stand for a member selected from the groups consisting of hydrogen, lower alkyl, hydroxy, nitro, alkylamino, dialkylamino, alkoxy, hydroxyalkyl-amino, dihydroxydialkylamino, alkylhydroxyalkylamino and carboxy, wherein R stands for a member selected from the group consisting of phenyl, naphthyl and pyrazolyl radicals.

7. The condensation products of the naphthoquinone-imine series, corresponding to the general formula

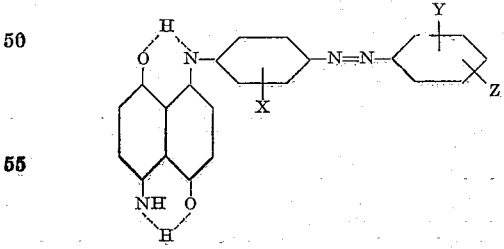

wherein X, Y and Z stand for a member selected from the group consisting of hydrogen, lower alkyl, hydroxy, nitro, alkylamino, dialkylamino, alkoxy, hydroxyalkyl-amino, dihydroxydialkylamino, alkylhydroxyalkylamino and carboxy.

8. The condensation product of the naphthoquinone-imine series of the formula

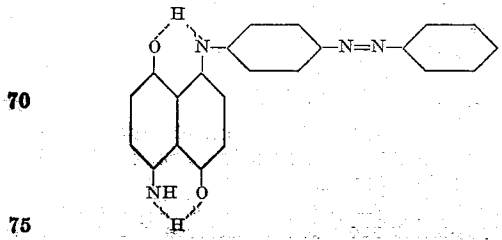

9. The condensation product of the naphthoquinone-imine series of the formula

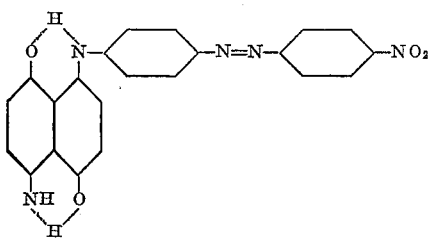

10. The condensation product of the naphthoquinone-imine series of the formula

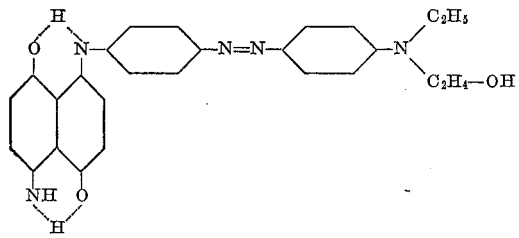

11. The condensation product of the naphthoquinone-imine series of the formula

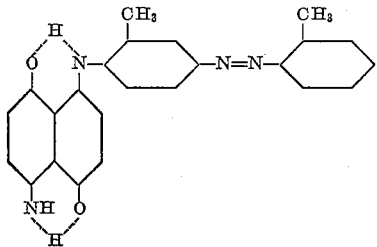

12. The condensation product of the naphthoquinone-imine series of the formula

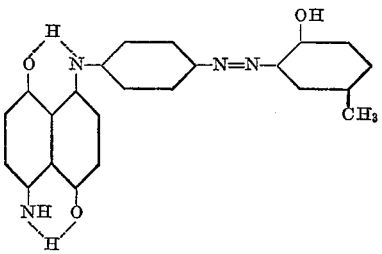

13. A process for the manufacture of a condensation product of the naphthoquinone-imine series, comprising the step of condensing 5-amino-8-hydroxy-1.4-naphthoquinone-imine-(1) in a solvent with 4-amino-azotoluene at a temperature of at least 60° C.

14. A process for the manufacture of a condensation product of the naphthoquinone-imine series, comprising the step of condensing 5-amino-8-hydroxy-1.4-naphthoquinone-imine-(1) in a solvent with 4-amino-2'-hydroxy-5'-methylazobenzene at a temperature of a least 60° C.

VALENTIN KARTASCHOFF.
ERNEST MERIAN.

No references cited.